(12) United States Patent
Gatt et al.

(10) Patent No.: US 11,162,551 B2
(45) Date of Patent: Nov. 2, 2021

(54) METHOD FOR ATTENUATING VIBRATIONS IN THE BRAKED WHEELS OF AIRCRAFT

(71) Applicant: SAFRAN LANDING SYSTEMS, Velizy Villacoublay (FR)

(72) Inventors: Antoine Gatt, Moissy-Cramayel (FR); Abdelbasset Hamdi, Moissy-Cramayel (FR); Gilles Auregan, Moissy-Cramayel (FR); Jean-Frédéric Diebold, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 16/607,584

(22) PCT Filed: Apr. 24, 2018

(86) PCT No.: PCT/EP2018/060409
§ 371 (c)(1),
(2) Date: Oct. 23, 2019

(87) PCT Pub. No.: WO2018/197448
PCT Pub. Date: Nov. 1, 2018

(65) Prior Publication Data
US 2020/0049212 A1  Feb. 13, 2020

(30) Foreign Application Priority Data
Apr. 24, 2017 (FR) ..................................... 17 53531

(51) Int. Cl.
*F16D 65/38* (2006.01)
*F16D 65/00* (2006.01)
(Continued)

(52) U.S. Cl.
CPC .......... *F16D 65/0006* (2013.01); *B64C 25/42* (2013.01); *F16D 55/36* (2013.01);
(Continued)

(58) Field of Classification Search
CPC ...... F16D 55/36; F16D 55/40; F16D 65/0006; F16D 65/0056; F16D 2200/0004;
(Continued)

(56) References Cited

U.S. PATENT DOCUMENTS 3,605,967 A    9/1971  Warren et al.
4,289,216 A *  9/1981  Shirai ................... F16D 55/226
                                                    188/218 XL
(Continued)

FOREIGN PATENT DOCUMENTS

FR    2 887 559 A1    12/2006

OTHER PUBLICATIONS

International Search Report for PCT/EP2018/060409 dated Jun. 13, 2018 [PCT/ISA/210].

*Primary Examiner* — Nicholas J Lane
(74) *Attorney, Agent, or Firm* — Sughrue Mion, PLLC

(57) ABSTRACT

The invention relates to a method for attenuating vibrations of an aircraft wheel/brake assembly arising during braking, the brake comprising rotor discs (2b) rotationally driven with the wheel by means of bars (5) secured to the wheel and engaging in notches (3b) of the rotor discs, and stator discs (2a) which are kept rotationally immobile by means of tenons (5) secured to a torque tube (1) of the brake and engaged in notches (3a) of the stator discs, the notches having flanks that are protected by brackets (7). The method involves selecting bracket/tenon pair and/or bracket/bar pairs with a coefficient of friction less than or equal to 0.6.

3 Claims, 3 Drawing Sheets

(51) Int. Cl.
*B64C 25/42* (2006.01)
*F16D 55/36* (2006.01)
*F16D 55/00* (2006.01)

(52) U.S. Cl.
CPC .. *F16D 65/0056* (2013.01); *F16D 2055/0008* (2013.01); *F16D 2055/0058* (2013.01); *F16D 2200/0021* (2013.01)

(58) Field of Classification Search
CPC ..... F16D 2055/0058; F16D 2055/0008; F16D 2055/0041; B64C 25/42
See application file for complete search history.

(56) References Cited

U.S. PATENT DOCUMENTS

| | | | | |
|---|---|---|---|---|
| 4,557,356 | A * | 12/1985 | Petersen | F16D 65/126 188/218 XL |
| 5,931,269 | A | 8/1999 | Detwiler et al. | |
| 2006/0269766 | A1* | 11/2006 | Swank | C22C 38/42 428/469 |
| 2007/0056812 | A1* | 3/2007 | Haupt | F16D 65/095 188/73.39 |
| 2007/0175709 | A1 | 8/2007 | Scelsi et al. | |
| 2008/0296109 | A1* | 12/2008 | Cress | F16D 65/126 188/265 |
| 2009/0236763 | A1 | 9/2009 | Simpson et al. | |
| 2010/0104465 | A1 | 4/2010 | Simpson et al. | |
| 2017/0174328 | A1* | 6/2017 | Rook | F16F 7/08 |
| 2017/0174330 | A1* | 6/2017 | Rook | B64C 25/44 |
| 2019/0331178 | A1* | 10/2019 | Steele | C23C 28/027 |

\* cited by examiner

_METHOD FOR ATTENUATING VIBRATIONS IN THE BRAKED WHEELS OF AIRCRAFT_

CROSS REFERENCE TO RELATED APPLICATIONS

This application is a National Stage of International Application No. PCT/EP2018/060409, filed on Apr. 24, 2018, which claims priority from French Patent Application No. 1753531, filed on Apr. 24, 2018, the entire contents of each of which are herein incorporated by reference in their entireties.

The invention relates to a method for attenuating vibrations in the braked wheels of aircraft that arise during braking.

BACKGROUND OF THE INVENTION

It is known that vibrations are likely to occur in the brake-mounted wheels of an aircraft when the aircraft brakes. These vibrations result from complex dynamic phenomena and have been dealt with in many ways. For example, it has been proposed for the hydraulic circuit supplying the brakes to be equipped with restrictors to prevent any hydraulic jerking that is likely to give rise to vibrations. It has also been proposed for the base of the torque tube to be provided with an anti-vibration (anti-whirl) ring reducing the intensity of the vibrations.

These solutions are not without drawbacks. The restrictors actually limit the flows available to control the brakes and therefore limit the dynamics. Furthermore, the use of an anti-vibration ring necessitates equipping the torque tube with a base, which increases the complexity and the weight of the tube.

SUBJECT MATTER OF THE INVENTION

The aim of the invention is to propose a method for attenuating vibrations in the braked wheels of aircraft that arise during braking that does not have the aforementioned disadvantages.

BRIEF DESCRIPTION OF THE INVENTION

In order to achieve this aim, a method is proposed for attenuating vibrations in an aircraft wheel/brake assembly that arise during braking, with the brake comprising rotor discs rotationally driven with the wheel by means of bars secured to the wheel and engaged in notches of the rotor discs, and stator discs, which are kept rotationally immobile by means of tenons secured to a torque tube of the brake and engaged in notches of the stator discs, with the sides of the notches being protected by brackets. According to the invention, the attenuation method comprises the selection of bracket/tenon and/or bracket/bar pairs with a friction coefficient that is less than or equal to 0.6.

The inventors conducted advanced braking simulations integrating the friction coefficient of the interfaces between the discs and the tenons or bars. These simulations revealed a considerable influence of this friction coefficient on the level of vibrations generated during braking. In particular, it appears that the vibrational amplitudes (characterized by the developed accelerations and measured in g) are generally proportional to the friction coefficient between the discs and the tenons or bars. The inventors thus discovered that selecting interfaces having a friction coefficient that is less than or equal to 0.6 allows this level of vibrations to be attenuated. By way of a reminder, when an aircraft touches down, the rotors of the brakes that were in the wheel bay beforehand are set into rotation and are subject to the surrounding temperature and to the airflow associated with the movement of the aircraft. It can be considered that the temperature of the brackets, bars and tenons is approximately between −40° C. and +40° C. When the braking force is exerted, the temperature of the brackets, bars and tenons will rapidly increase. It is considered that most of the time this temperature remains below a maximum extreme temperature of approximately 400° C. (other parts of the brake can be hotter or, on the contrary, cooler). In the braking conditions relating to the landing of an aircraft, the temperature range experienced by the interface of the brackets with the wheel or the tube therefore is between −40° C. and 400° C.

Such friction coefficients can be obtained by suitably selecting the material for the brackets, which are fitted on the discs and which come into contact with the tenons and bars, the material of the tenons and bars, or by providing said tenons and bars with a suitable coating in order to obtain such friction coefficients.

Preferably, bracket/tenon and/or bracket/bar pairs are selected with a friction coefficient that is less than or equal to 0.5.

Preferably, bracket/tenon and/or bracket/bar pairs are selected with a friction coefficient that is less than or equal to 0.4.

Preferably, bracket/tenon and/or bracket/bar pairs are selected with a friction coefficient that is less than or equal to 0.2. This threshold has allowed, in the aforementioned simulations, the vibration amplitudes to be limited to less than 20 g.

BRIEF DESCRIPTION OF THE DRAWINGS

The invention will be better understood in the light of the following description, with reference to the figures of the accompanying drawings, in which.

DETAILED DESCRIPTION OF THE INVENTION

Figure 1:
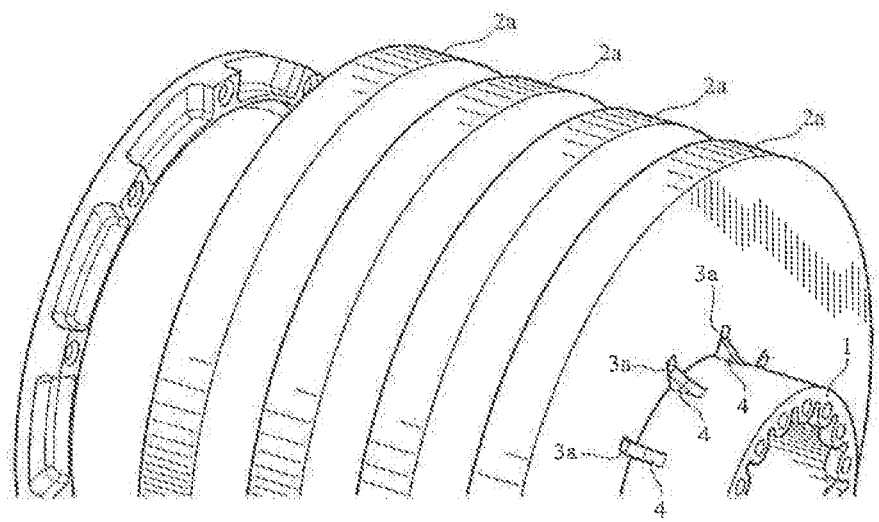
FIG. 1 is a perspective view of a torque tube of a brake equipped with tenons and onto which discs are fitted. Only the stator discs are shown.
Figure 2:
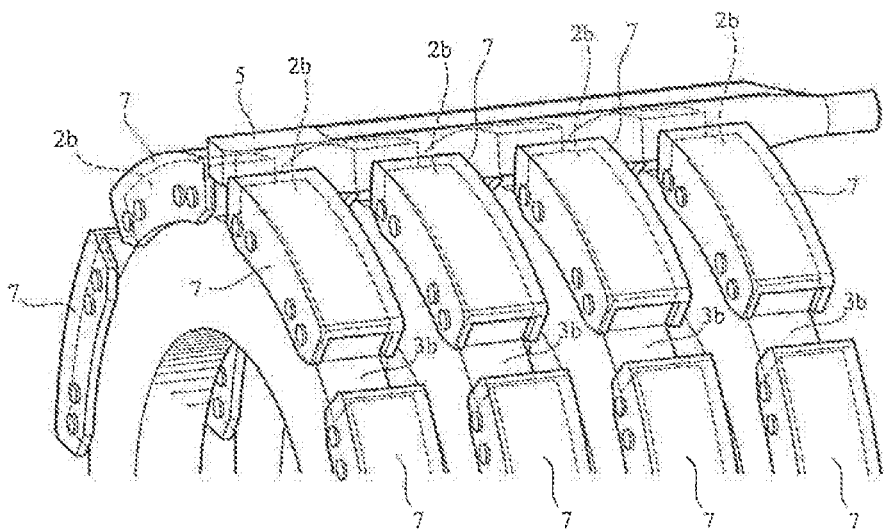
FIG. 2 is a perspective view of the rotor discs of the brake of FIG. 1 receiving, in the notches thereof, bars of the wheel to be braked.
Figure 3:
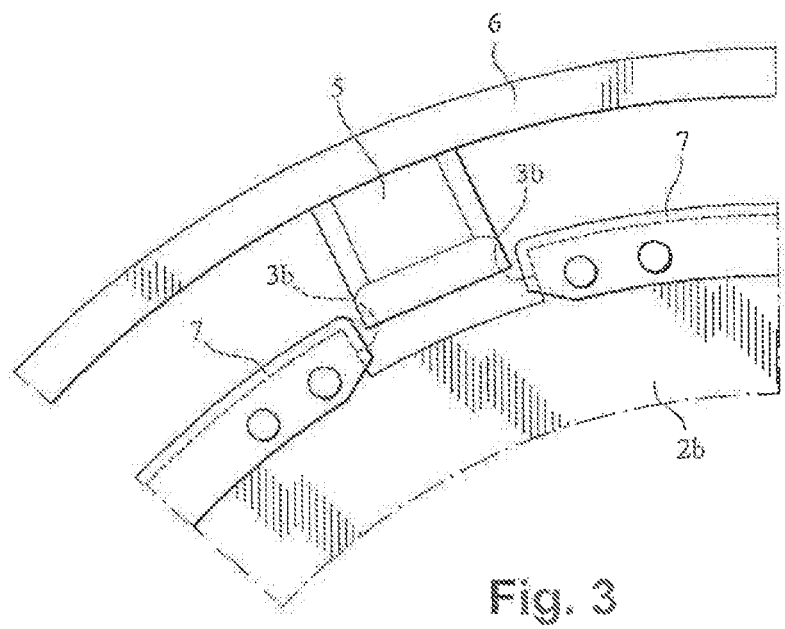
FIG. 3 is a perspective view of a bracket equipping a notch of a rotor disc.

In a manner per se known, and as shown in FIGS. 1 and 2, a typical brake of a modern aircraft, for example, a brake of an airliner of the type produced by AIRBUS or BOEING, comprises a torque tube 1, onto which carbon discs are fitted. These discs include stator discs 2a, which comprise notches 3a, into which tenons 4 are engaged that are secured to the torque tube, so that the stator discs 2a are rotationally immobilized. In this case, the tenons 4 are integrally formed with the torque tube 1, but they could be added onto the torque tube. Alternating with the stator discs 2a, rotor discs 2b are provided that comprise notches 3b, into which bars 5 are engaged that are secured to the rim 6 of a wheel (shown in FIG. 3) that extends around the brakes, so that the rotor discs rotate with the wheel. In this case, the bars 5 are added onto the rim of the wheel, but they could be integrally formed with the rim. The brake comprises hydraulic or electromechanical braking actuators (not shown herein), which selectively press the discs together in order to generate a friction force between the discs and to thus brake the wheel. As shown in FIG. 3, the sides of the notches are generally protected by brackets 7, which define the interface between the discs and the tenons or bars.

Figure 4:
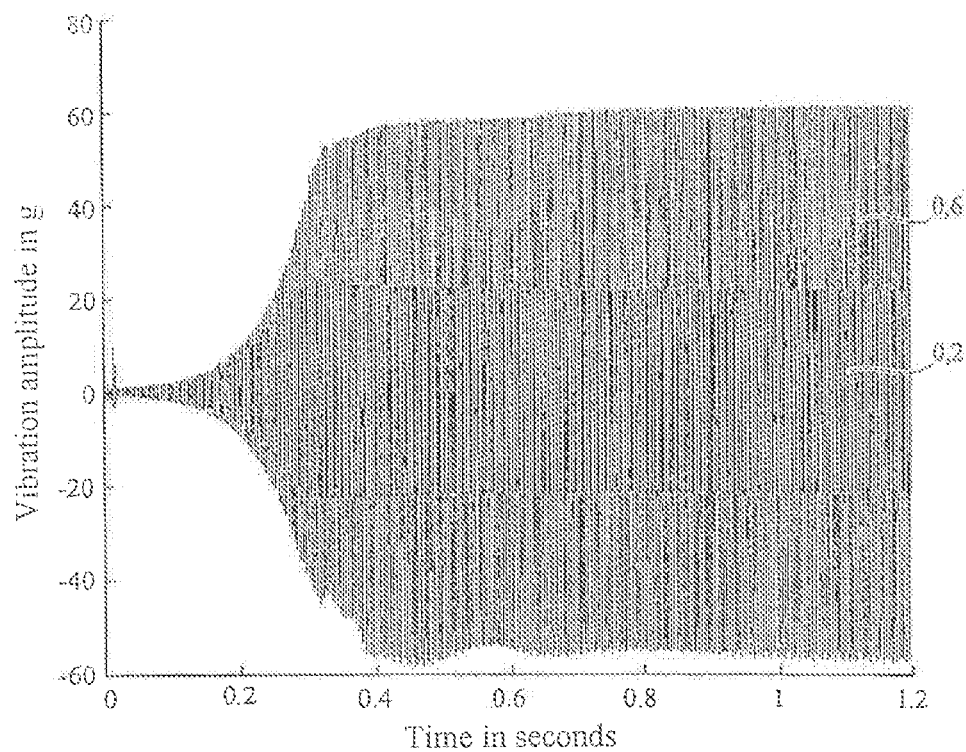
FIG. 4 is a graph showing the vibrations generated by braking, respectively with a friction coefficient of 0.6 and a friction coefficient of 0.2.

FIG. 4 shows the amplitude of the vibrations in the form of the acceleration level (measured in g) caused by the vibrations that occur during braking, while respectively retaining a friction coefficient of 0.6 and a friction coefficient of 0.2 for the interface between the discs and the tenons or bars. After an initial emergence and development phase, the vibrations stabilize to a few tens of seconds at a maximum amplitude level, which remains relatively constant. The inventors have noted that the influence of the friction coefficient is crucial. It has been observed that the vibration level drops when the friction coefficient drops. In the illustrated simulation, the friction coefficient of 0.6 results in a vibration amplitude of ±60 g, whereas the friction coefficient of 0.2 results in a vibration amplitude of ±20 g.

Figure 5:
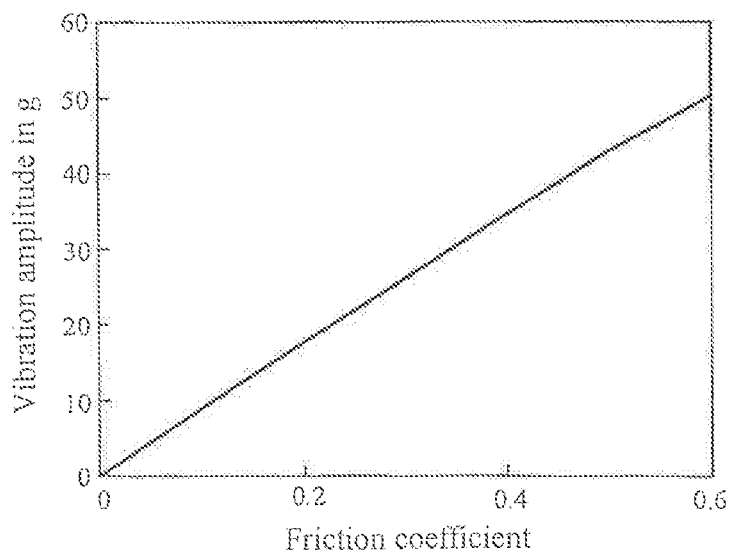
FIG. 5 is a graph showing the relationship between the friction coefficient and the maximum level of vibrations.

This discovery prompted the inventors to explore the influence of this parameter. FIG. 5 shows the result obtained by varying this parameter, namely that the maximum amplitude of the vibrations is substantially proportional to the retained friction coefficient.

Thus, the selection of interfaces having a friction coefficient that is less than or equal to 0.6 allows effective limitation of the maximum amplitude of the vibrations. Such a friction coefficient can be obtained in various ways, such as, for example:
  by selecting a combination of materials for the bracket/tenon or bracket/bar interface with a low friction coefficient;
  by applying a surface coating on the bracket having, with the bars or tenons, a low friction coefficient;
  by applying, on the bars or the tenons, a surface coating having, with the brackets, a low friction coefficient;
  by covering the bars or the tenons with a protective sheet having, with the brackets, a low friction coefficient.

Obtaining such friction coefficients has been able to be verified using various experiments that are described below, resulting in measured friction coefficients of less than 0.6, down to 0.2 or less. These experiments relate to bar/bracket combinations, but clearly can be applied to tenon/bracket combinations:

First Example brackets made of 15CrMoV6 steel;
bars made of X5CrNiMo16-5 steel with a coating of cobalt enriched tungsten carbide (WC/Co/Cr), unground with roughness Ra of=3.2 microns.

A tribometer identification provides a friction coefficient of substantially 0.5.

Second Example brackets made of 17-22AS steel;
bars made of X5CrNiMo16-5 steel with a coating of cobalt enriched tungsten carbide (WC/Co/Cr), ground with roughness Ra of=1.6 microns.

A tribometer identification provides a friction coefficient between 0.2 and 0.4.

Third Example brackets made of 15CrMoV6 steel, with a surface deposit of carbon particles;
bars made of X5CrNiMo16-5 steel with a coating of cobalt enriched tungsten carbide (WC/Co/Cr), unground with roughness Ra of=3.2 microns, with a surface deposit of carbon particles.

A tribometer identification provides a friction coefficient of substantially 0.2.

It is thus technically possible to obtain friction coefficients of less than 0.6, and even lower, of approximately 0.2. A friction coefficient this low has enabled the maximum acceleration level to be limited to ±20 g in the simulations conducted by the inventors, which complies with the recent specifications published by certain aircraft manufacturers.

It is possible, in the examples described, to lower the friction coefficient by reducing the roughness.

The invention is not limited to the above description, but, on the contrary, encapsulates any variant falling within the scope defined by the claims.

The invention claimed is:

1. A method for attenuating vibrations in an aircraft wheel/brake assembly that arise during braking, with a brake comprising rotor discs rotationally driven with the wheel by bars secured to the wheel and engaged in notches of the rotor discs, and stator discs, which are kept rotationally immobile by tenons secured to a torque tube of the brake and engaged in notches of the stator discs, the notches having sides protected by brackets, wherein the brackets are made of 15CrMoV6 steel, and the bars or tenons are made of X5CrNiMo16-5 steel with a coating of cobalt enriched tungsten carbide (WC/Co/Cr), unground with roughness Ra of ≤3.2 microns.

2. A method for attenuating vibrations in an aircraft wheel/brake assembly that arise during braking, with a brake comprising rotor discs rotationally driven with the wheel by bars secured to the wheel and engaged in notches of the rotor discs, and stator discs, which are kept rotationally immobile by tenons secured to a torque tube of the brake and engaged in notches of the stator discs, the notches having sides protected by brackets, wherein the
  brackets are made of 17-22AS steel, and the
  bars or tenons are made of X5CrNiMo16-5 steel with a coating of cobalt enriched tungsten carbide (WC/Co/Cr), ground with roughness Ra of <1.6 microns.

3. A method for attenuating vibrations in an aircraft wheel/brake assembly that arise during braking, with a brake comprising rotor discs rotationally driven with the wheel by bars secured to the wheel and engaged in notches of the rotor discs, and stator discs, which are kept rotationally immobile by tenons secured to a torque tube of the brake and engaged in notches of the stator discs, the notches having sides protected by brackets, wherein the
  brackets are made of 15CrMoV6 steel, with a surface deposit of carbon particles, and the
  bars or tenons are made of X5CrNiMo16-5 steel with a coating of cobalt enriched tungsten carbide (WC/Co/Cr), unground with roughness Ra of <3.2 microns, with a surface deposit of carbon particles.

* * * * *